(12) United States Patent
Ishii

(10) Patent No.: US 6,998,756 B2
(45) Date of Patent: Feb. 14, 2006

(54) ROTOR SHAFT

(75) Inventor: Ichiro Ishii, Ueno (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/946,325

(22) Filed: Sep. 22, 2004

(65) Prior Publication Data

US 2005/0096141 A1 May 5, 2005

(30) Foreign Application Priority Data

Oct. 2, 2003 (JP) .............................. 2003-343975

(51) Int. Cl.
*H02K 7/18* (2006.01)

(52) U.S. Cl. ........................ 310/261; 310/90; 310/152; 310/156.01; 464/179; 403/292; 403/301

(58) Field of Classification Search ................ 310/261, 310/90, 152, 156.01; 464/179, 182; 403/292, 403/301

See application file for complete search history.

(56) References Cited

U.S. PATENT DOCUMENTS 3,282,614 A * 11/1966 Entrikin ....................... 403/182
4,935,656 A * 6/1990 Kawamura ............. 310/156.08
5,964,663 A   10/1999 Stewart et al.

\* cited by examiner

*Primary Examiner*—Darren Schuberg
*Assistant Examiner*—David W. Scheuermann
(74) *Attorney, Agent, or Firm*—Squire, Sanders & Dempsey LLP

(57) ABSTRACT

The present invention provides a rotor shaft, comprising: a rod member (26); and a plurality of separately formed component parts (such as a compressor wheel 10, a turbine wheel 11 and a rotor 14 of an electric generator) through which the rod member extends so that the plurality of component parts are joined together on an axis of the rod member, wherein mutually facing axial end surfaces of adjoining ones of the plurality of component parts are formed with annular projections (22, 23) having a substantially same radial dimension (or thickness) such that an outer circumferential surface of the annular projection of one component part can tightly contact an inner circumferential surface of the annular projection of an adjoining component part.

6 Claims, 3 Drawing Sheets

ROTOR SHAFT

TECHNICAL FIELD

The present invention relates to a rotor shaft. More specifically, the present invention relates to a rotor shaft, such as a main shaft of an electric generator driven by a gas turbine engine, comprising a plurality of separately made component parts which are joined together on an axis of a rod member passing through the plurality of component parts.

BACKGROUND OF THE INVENTION

A main shaft of an electric generator driven by a gas turbine engine generally comprises a plurality of individually formed component parts such as a compressor wheel, a turbine wheel, a support structure for permanent magnets, a plurality of journals, thrust plates, etc., and these component parts are joined together on a common axis. Conventionally, the joint of the component parts is typically achieved by passing a single rod member through the component parts to be joined together, and then applying an axial load upon abutting surfaces of the component parts on the rod member by tightening a bolt nut at an end of the rod member (see U.S. Pat. No. 5,964,663, FIG. 7, for example).

In the conventional rotor shaft disclosed in U.S. Pat. No. 5,964,663, however, some of the component parts constituting the rotor shaft are equipped with a fitting portion at a position relatively close to an inner periphery and some of the fitting portions tend to have a large axial dimension. In addition, fitting portions often have different radial dimensions (or thicknesses). As a result, uneven axial loads may act upon abutting surfaces of the adjacent component parts, and varying amounts of interference may be created between the fitting portions. Further, the amount of interference can decrease during operation due to thermal expansion and/or centrifugal expansion of the component parts, leading to a reduced fitting strength. Consequently, the produced rotor shafts may have different natural frequencies one from another and/or an excessive oscillation can take place at a resonance point, making it difficult to suppress oscillation during operation. Particularly, in a rotor shaft utilizing an air bearing as a radial bearing in order to achieve a higher rotational speed, a restraining force acting upon the rotor shaft tends to be relatively small, and thus, if the axial load acting upon the abutting surfaces of the mating component parts is insufficient, an oscillation can become excessively large when a primary bending resonance frequency is reached as the rotation of the rotor shaft is accelerated. This makes it difficult for the rotor to pass through the resonance frequency safely.

In order to solve such problems, it is necessary to ensure a sufficient interference between fitting portions of the mating members during operation and at the same time apply a sufficiently large axial load upon the abutting surfaces between the mating component parts, although it was quite difficult to meet the requirements in the conventional structure.

BRIEF SUMMARY OF THE INVENTION

In view of such problems of the prior art, a primary object of the present invention is to provide a rotor shaft comprising a plurality of separately formed component parts, which can ensure sufficiently large fitting strength between mating component parts during operation of the rotor shaft and at the same time can allow a sufficiently large axial load to act upon the abutting surfaces of the adjoining component parts.

According to the present invention, such objects can be accomplished by providing a rotor shaft, comprising: a rod member (26); and a plurality of separately formed component parts (which may comprise a compressor wheel 10, turbine wheel 11 and a rotor 14 of an electric generator when the rotor shaft is used in a gas turbine electric generator) through which the rod member extends so that the plurality of component parts are joined together on an axis of the rod member, wherein mutually facing axial end surfaces of adjoining ones of the plurality of component parts are formed with annular projections (22, 23) having a substantially same radial dimension (or thickness) such that an outer circumferential surface of the annular projection of one component part can tightly contact an inner circumferential surface of the annular projection of an adjoining component part.

Particularly, it will be preferred if the annular projections are provided in an outer peripheral portion of the mutually facing surfaces of the adjoining ones of the plurality of component parts and/or if the radial dimension of the annular projections is substantially smaller than an outer diameter of said rotor shaft. In a preferred embodiment, the radial dimension of the annular projections may be set at between $\frac{1}{10}$ and $\frac{1}{15}$ of the outer diameter of the rotor shaft.

According to the present invention mentioned above, because the annular projections which are fitted to each other have a substantially equal thickness, they will undergo a substantially same amount of radial expansion due to the thermal expansion and/or centrifugal expansion during operation, whereby advantageously maintaining a tight contact therebetween. Further, the provision of the annular projections in an outer peripheral portion of the end surfaces of the rotor shaft component parts can result in a larger diameter of the annular projections. This also contributes to equalizing the amount of expansions of the inner and outer annular projections due to centrifugal expansion during rotation of the rotor shaft, to thereby maintain the tight contact between the annular projections. Further, the annular projections having a substantially small thickness (or radial dimension) can lower the rigidity thereof and thus reduce the press-fit load, whereby increasing the axial load acting upon the abutting surfaces of the fitting portions of the rotor shaft component parts. This can effectively lead to a reduced fluctuation or displacement of the rotation center of the rotor shaft.

More preferably, an outer one of the mutually fitted annular projections of adjoining component parts has a slightly larger axial dimension (or length) than an inner one of the mutually fitted annular projections. In this way, when the two fitting portions of adjoining component parts are fitted to each other and are applied with an axial load, it is ensured that an axial end of the outer annular projection abuts a step portion (or shoulder surface) formed outside the inner annular projection, contributing to increase in the axial load acting upon the abutting surfaces of the fitting portions of the rotor shaft component parts.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
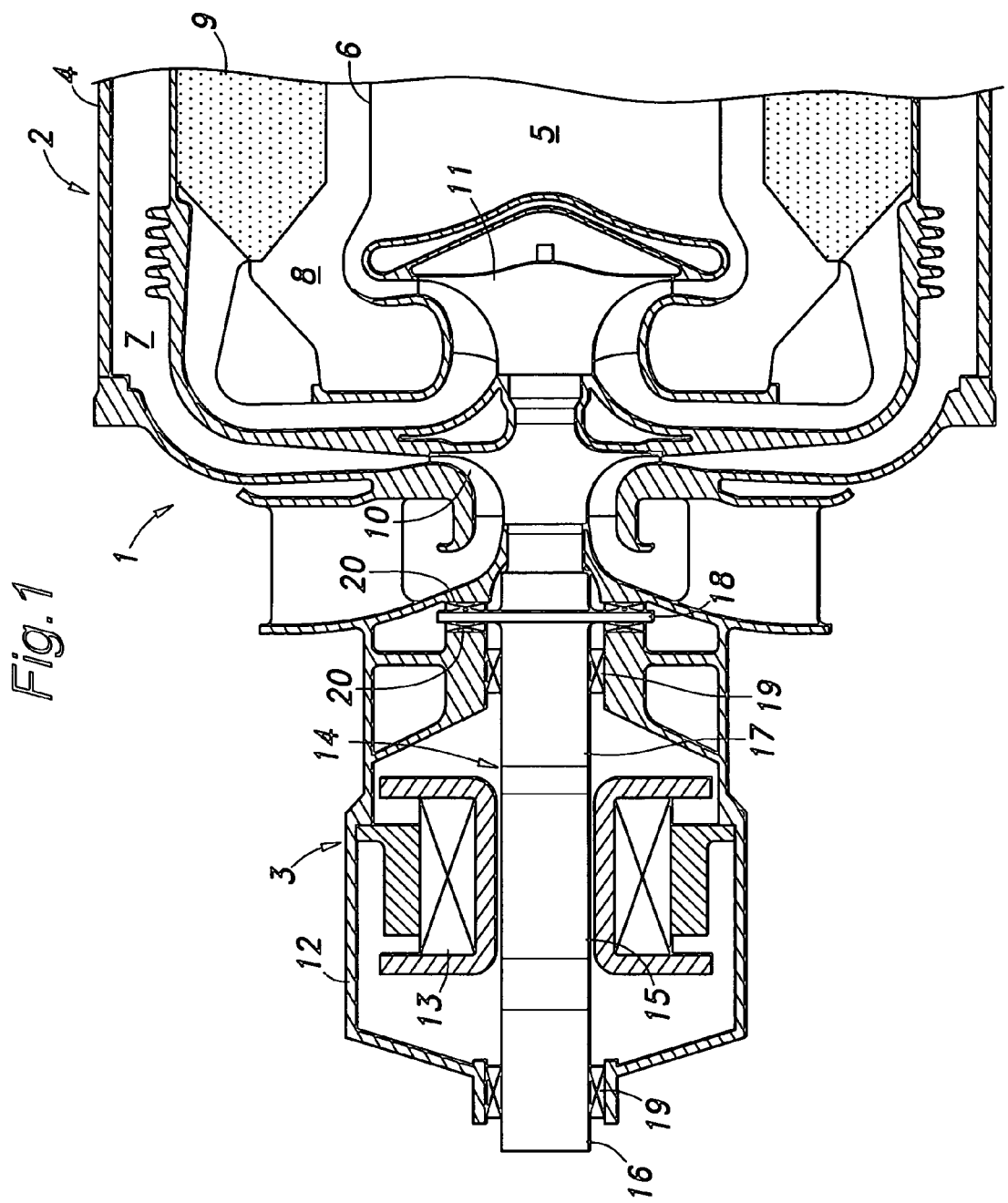
FIG. 1 is a cross-sectional view showing a structure of a gas turbine generator to which the present invention is applied.

FIG. 1 is a cross-sectional view showing a structure of a gas turbine generator to which the present invention is applied. This gas turbine engine 1 comprises an engine portion 2 for generating a driving force, and an electric generator portion 3 rotationally driven by the engine portion 2.

The engine portion 2 has an outer housing 4 of which end away from the generator portion 3 is substantially closed, and an inner housing 6 concentrically received in the outer housing 4 to define a combustion chamber 5. Between the outer housing 4 and the inner housing 6 are provided an air intake passage 7, a combustion gas passage 8, and a heat exchanger 9.

The engine portion 2 further comprises a compressor wheel 10 for taking in and compressing outer air, and a turbine wheel 11 rotationally driven by the flow of combustion gas, where the compressor wheel 10 and the turbine wheel 11 are provided concentrically with each other. Although not shown in the drawing, diffusers, stator vanes, etc. are provided at outlets of the compressor wheel 10 and turbine wheel 11.

The generator portion 3 comprises a substantially cylindrical housing 12 and a stator coil 13 received in the housing 12 so as to be concentric with the compressor wheel 10 and the turbine wheel 11. A rotor shaft 14 is passed through an air core of the stator coil 13 where the rotor shaft 14 is concentric and integral with the compressor wheel 10 and the turbine wheel 11. The rotor shaft 14 mainly consists of three portions, i.e., a permanent magnet mount portion 15 located at a position corresponding to the air core of the stator coil 13, and two journal portions 16, 17 axially flanking the permanent magnet mount portion 15. The journal portion 17 closer to the compressor wheel 10 is integrally provided with a thrust plate 18.

The two journal portions 16, 17 and the thrust plate 18 are rotatably supported by air-lift type radial bearings 19 and thrust bearing 20 which are integrally provided to the housing 12.

Figure 2:
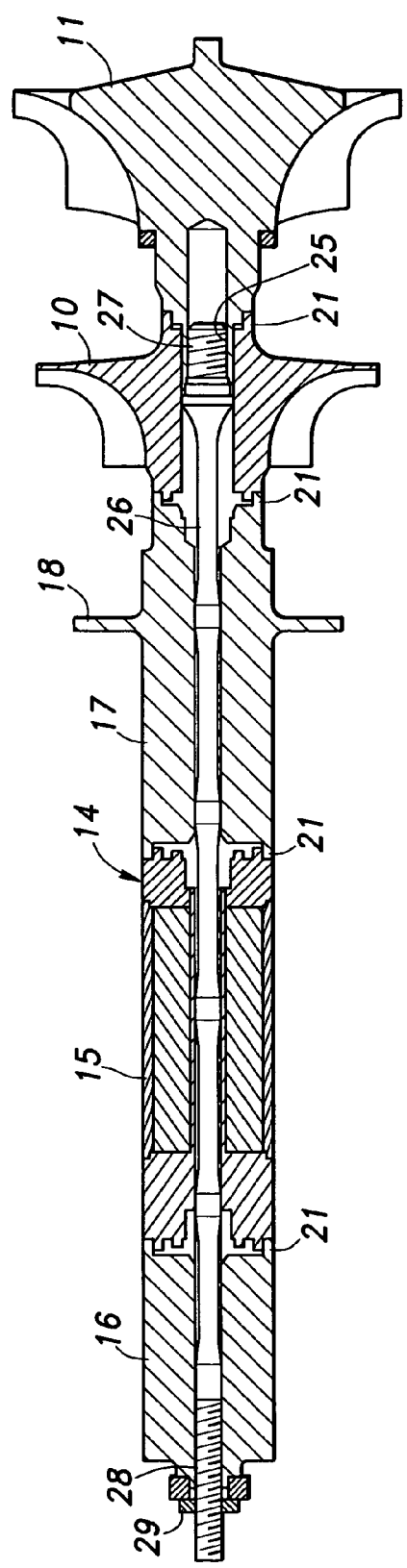
FIG. 2 is an axial cross-sectional view showing a rotor shaft according to the present invention.

FIG. 2 is an axial cross-sectional view of the rotor shaft 14 which is integral with the compressor wheel 10 and the turbine wheel 11. As described above, the rotor shaft 14 comprises the axial end journal portion 16, permanent magnet mount portion 15, axially middle journal portion 17 and thrust plate 18. These component parts are separately made from a respective material best suit to each component part by an appropriate process. Each of the component parts inclusive of the compressor wheel 10 and the turbine wheel 11 are formed with a fitting portion 21 at their axial end(s) so that they can be joined together on a single rod member 26 passing the center of the component parts by engaging the fitting portion 21 of one component part to the fitting portion 21 of the adjoining component part.

Figure 3:
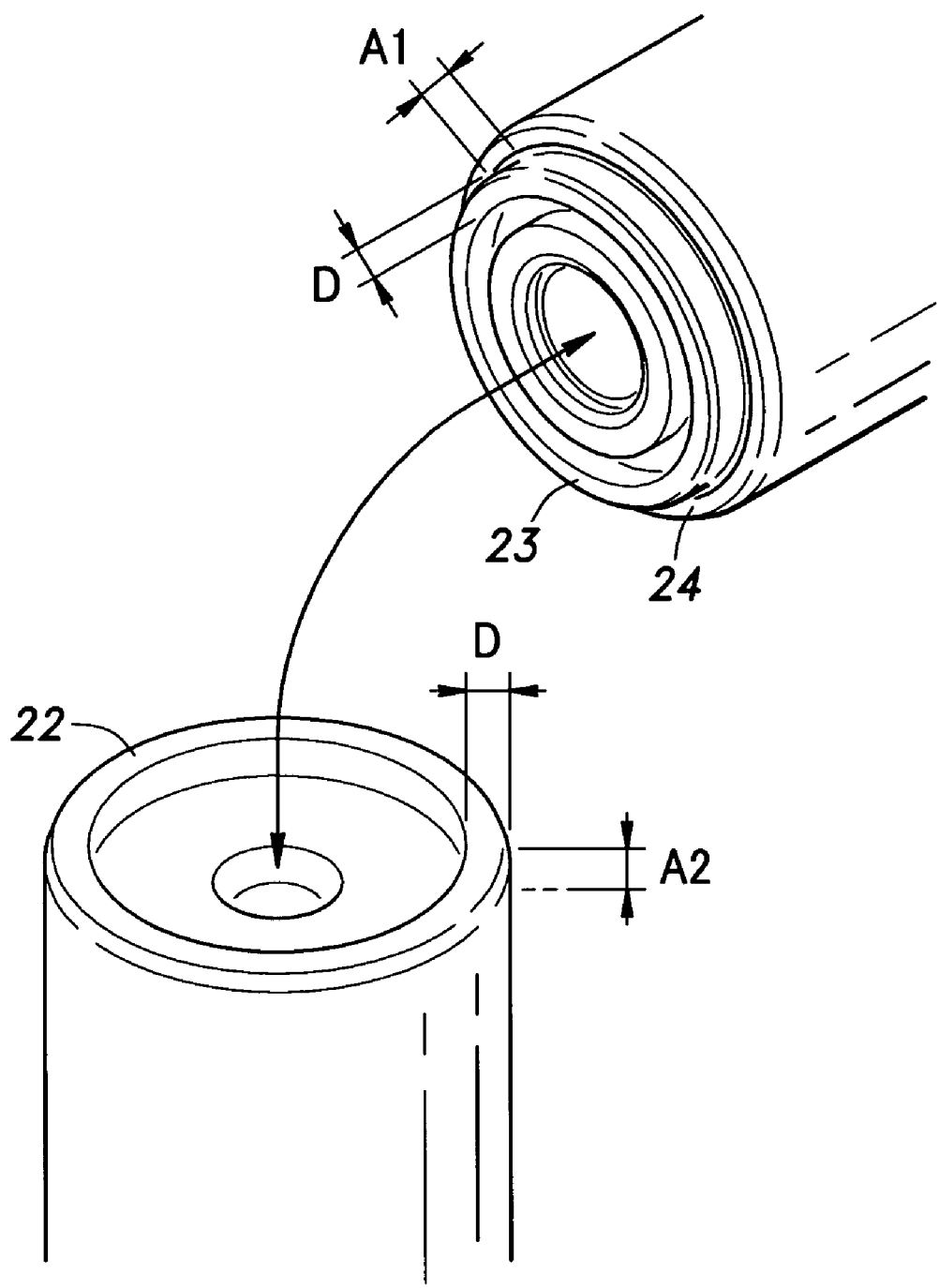
FIG. 3 is a perspective view showing the fitting portions of mating component parts of the rotor shaft according to the present invention.

As shown in detail in FIG. 3, one of the mutually engaged fitting portions 21 has a short annular projection 22 formed along an outer periphery of a component part while the other of the mutually engaged fitting portions 21 has a short annular projection 23 having an outer diameter substantially equal to an inner diameter of the annular projection 22. The annular projections 22, 23 each have a substantially rectangular cross-section and have a substantially same radial dimension (or thickness) D. Further, their dimensional tolerance is set such that the annular projections 22, 23 are engaged to each other with an interference fit where an axial dimension A2 of the outer annular projection 22 is slightly larger than an axial dimension A1 of the inner annular projection 23 (A1<A2). In this way, when the two fitting portions are mated to each other and are applied with an axial load, it is ensured that an axial end of the outer annular projection 22 abuts a step portion (or shoulder surface) 24 formed outside the inner annular projection 23.

When assembling the rotor shaft 14 comprising the plurality of separately formed component parts with the compressor wheel 10 and the turbine wheel 11, first, an external thread 27 formed at one end of the rod member 26 is fully engaged with an internal thread 25 formed at a center of a smaller diameter portion of the turbine wheel 11. Subsequently, the axially middle journal portion 17 integrally formed with the thrust plate 18, the permanent magnet mount portion 15 and the axial end journal portion 16 are fitted on the rod member 26 in this order such that the mutually facing annular projections 22, 23 of the adjacent component parts are press fitted to each other. Then, a lock nut 29 is tightened onto an external thread 28 at the other axial end of the rod member 26, where a tension is applied on the rod member 26.

In this way, the component parts of the rotor shaft are joined together on the common axis where according to the present invention, the axial dimensions A1, A2 of the fitting portions 21 including the annular projections 22, 23 are relatively small such that a loss in the axial load that would result due to a frictional resistance of the fitting portions 21 can be reduced, and thus the axial load applied to the abutting surfaces of the component parts of the rotor shaft can be increased and a press-fit loads of the component parts can be equalized. Further, the annular projections 22, 23 constituting the fitting portions 21 are provided at an outer periphery of each component part, and their axial dimension (or thickness) D is small and substantially the same, whereby a change in the amount of interference in the fitting portions due to a difference in the thermal expansion and in the centrifugal expansion between the component parts can be minimized. Therefore, the mutual engagement force provided by the fitting portions can be kept from reducing during operation, preventing displacement of the rotation center and reducing an amount of oscillation at the resonance frequency to whereby allow the rotor shaft to safely pass the resonance point as it is accelerated.

It should be noted that the radial dimension D of the annular projections 22, 23 needs to be set so as to avoid an excessive press-fit load and at the same time ensure a sufficient interference during operation. In a preferred embodiment of the present invention, the dimension D is set at 4 mm for the rotor shaft 14 having an outer diameter of 48 mm. In order to achieve appropriate press-fit load and interference at the same time, it is preferred that the dimension D should be set at about 1/10 to 1/15 of the diameter of the rotor shaft.

Further in the structure according to the present invention, the fitting portions 21 tend to undergo less plastic deformation than the conventional structure, and therefore, when the rotor shaft is disassembled and assembled repeatedly, substantially the same joint strength can be achieved every time the rotor shaft is assembled. This allows a larger number of repeated disassemble and assemble of the rotor shaft for overhaul, thus contributing to increasing the total durability of the rotor shaft.

As described above, the rotor shaft according to the present invention can advantageously achieve higher joint strength between the component parts thereof, and can be utilized not only in a turbine engine with an electric generator as illustrated in the above embodiment but also in other rotating machinery such as a supercharger having a compressor wheel and a turbine wheel provided on a common axis.

Although the present invention has been described in terms of a preferred embodiment thereof, it is obvious to a person skilled in the art that various alterations and modifications are possible without departing from the scope of the present invention which is set forth in the appended claims.

What is claimed is:

1. A rotor shaft, comprising:
   a rod member; and
   a plurality of separately formed component parts through which the rod member extends
   so that the plurality of component parts are joined together on an axis of said rod member,
   wherein mutually facing axial end surfaces of adjoining ones of said plurality of component parts are formed with annular axial projection having a substantially same radial dimension such that an outer circumferential surface of said annular axial projection of one component part can tightly contact an inner circumferential surface of said annular axial projection of an adjoining component part.

2. A rotor shaft according to claim 1, wherein said plurality of component parts comprise a compressor wheel, a turbine wheel and a rotor of an electric generator.

3. A rotor shaft according to claim 1, wherein said annular axial projections are provided in an outer peripheral portion of said mutually facing surfaces of said adjoining ones of said plurality of component parts.

4. A rotor shaft according to claim 1, wherein said radial dimension of said annular axial projections is substantially smaller than an outer diameter of said rotor shaft.

5. A rotor shaft according to claim 4, wherein said radial dimension of said annular axial projections is set at between $1/10$ and $1/15$ of said outer diameter of said rotor shaft.

6. A rotor shaft according to claim 1, wherein an outer one of said mutually fitted annular axial projections of adjoining component parts has a slightly larger axial dimension than an inner one of said mutually fitted annular projections such that an axial end of the outer one of said annular axial projections abuts a shoulder surface formed outside the inner one of said annular axial projections.

* * * * *